United States Patent [19]
Rimpler

[11] Patent Number: 5,366,702
[45] Date of Patent: Nov. 22, 1994

[54] APPARATUS FOR GENERATING OZONE UTILIZING AN OSCILLATING PLATE ELECTRODE

[76] Inventor: Manfred Rimpler, Rabensberg 19, D-3002 Wedemark, Germany

[21] Appl. No.: 98,358
[22] PCT Filed: Dec. 11, 1992
[86] PCT No.: PCT/EP92/02875
§ 371 Date: Oct. 8, 1993
§ 102(e) Date: Oct. 8, 1993
[87] PCT Pub. No.: WO93/12035
PCT Pub. Date: Jun. 24, 1993

[30] Foreign Application Priority Data
Dec. 12, 1991 [DE] Germany .............. 4141025

[51] Int. Cl.$^5$ .............. B21J 19/12; C01B 13/11
[52] U.S. Cl. .............. 422/186.07; 422/186.16
[58] Field of Search .............. 422/186.07, 186.14, 422/186.16

[56] References Cited

U.S. PATENT DOCUMENTS

| | | | |
|---|---|---|---|
| 3,899,682 | 8/1975 | Lowther | 250/532 |
| 4,027,169 | 5/1977 | Lowther | 250/536 |
| 4,545,960 | 10/1985 | Erz et al. | 422/186.07 |
| 4,606,892 | 8/1986 | Bachhofer et al. | 422/186.2 |
| 4,694,376 | 9/1987 | Gesslauer | 361/235 |
| 4,892,713 | 1/1990 | Newman | 422/186.07 |

FOREIGN PATENT DOCUMENTS 299248 3/1916 Germany .

OTHER PUBLICATIONS

Patent Abstracts of Japan vol. 013, No. 579 (C-668) 20 Dec. 1989, & JP, A, 12 42 405 (Yunisoido KK) 27 Sep. 1989.
Database WPIL Week 8945, 27 Sep. 1989, Derwent Publications, Ltd., London, GB; AN 89-327520/45 & JP, A, 1 242 405 (Unisoid KK).
Database WPIL Week 8125, 8 Oct. 1980, Derwent Publications, Ltd., London, GB; AN 81-45638D/25 & SU, A, 768 751 (Gipropromteplitsa).
Patent Abstracts of Japan, vol. 012, No. 472 (C-551) 9 Dec. 1988, & JP, A, 63 190 702 (Koji Takamura) 8 Aug. 1988.
Database WPIL Week 8337, 28 Feb. 1983, Derwent Publications, Ltd., London, GB; AN 83-762944/37 & RO, A, 81 423 (Inst Invatamint Sup).
Dimitriou, M. A., "Design Guidance Manual for Ozone Systems", Pan American Committee of the International Ozone Association, pp. 4, 11, 57–72; 1990.

Primary Examiner—Donald P. Walsh
Assistant Examiner—Daniel Jenkins
Attorney, Agent, or Firm—McAulay Fisher Nissen Goldberg & Kiel

[57] ABSTRACT

Apparatus for generating ozone with a high voltage source and at least two spaced plate electrodes with an interposed dielectric for forming at least one flow path, at least one of the plate electrodes being oscillatable, the plate electrode comprising two layers of electrically conductive material, whereof at least one layer is oscillatable, a resilient-attenuating material is placed between the two layers and the two layers are fixed in order to permit oscillations of the electrodes.

16 Claims, 4 Drawing Sheets

APPARATUS FOR GENERATING OZONE UTILIZING AN OSCILLATING PLATE ELECTRODE

BACKGROUND OF THE INVENTION

1. Field of the Invention

The invention relates to an apparatus for generating or producing ozone with a high voltage source and at least two spaced plate electrodes having a dielectric positioned between them accompanied by the formation of at least one flow path.

2. Background Art

Ozone is the triatomic modification of oxygen and is inter alia formed under the influence of an electric field. In the case of a so-called silent discharge (corona discharge), oxygen ($O_2$) is, in part, converted into ozone. The electric discharge brings about a partial cleavage of the $O_2$ molecules into free atoms which, when meeting uncleaved molecules, become attached to the latter. Electric energy is consumed during ozone formation and the mechanical equivalent of heat for this is 34.5 kcal/mole $O_3$. On heating, ozone decomposes, so that energy is given off and $O_2$ is formed. Gas very rapidly decomposes at temperatures above 100° C. or in the presence of catalysts at ambient temperature.

Ozone is much more reactive than oxygen and is consequently an extremely powerful oxidant, which is used in petrochemistry for converting olefins into aldehydes, ketones or carboxylic acid. It is also used as a bleaching agent for organic substances and for sterilizing drinking water and workrooms.

On an industrial scale ozone is generally produced by means of a silent discharge. Oxygen or an oxygen-containing gaseous mixture is passed through a flat or annular gap between two electrodes and an interposed dielectric. In the various known apparatuses and processes for producing ozone, an attempt has been made to increase the ozone yield, while avoiding ozone heating.

German Patent 3 108 563 discloses an apparatus for generating ozone in which means are provided to control the frequency and amplitude of the a.c. voltage generating the electric field, so as to improve the ozone yield. The high voltage generators are operated in the pulse mode or the a.c. frequency is increased, because in both cases an increased ozone yield is obtained. However, the thermal losses also increase, so that when ozone is produced according to the principle of the silent discharge the discharge gaps become heated and this leads to a reduction in the ozone yield.

Apparatuses for producing ozone, also known as ozonizers, operated in the pulse mode suffer from the further disadvantage that the discharge between the two electrodes is punctiform or lenticular as a result of the edge slope, i.e., does not take place on the entire electrode circumference. As a result burn-in holes are formed on the electrodes, so that the ozone yield is reduced and a satisfactory apparatus function is not obtained.

DE-OS 2 853 436 discloses for increasing the ozone yield to create a turbulent flow in the discharge gaps by introducing bodies. However, this leads to a certain increase in the flow channels, so that the field strength must be increased. In addition, relatively high laminar portions remain in the flow interfaces in this process.

DE-OS 2 644 978 discloses an ozonizer based on a high a.c. voltage, while excluding a dielectric. For this purpose it is necessary to have a technically adequately known plate construction, so as to maintain the spacing between two plate electrodes, between which is located in current connection-free manner at least one bipolar electrode.

Finally, German Patent 299 248 describes an apparatus having fixed electrodes, in which the spacing of the electrodes must be kept constant with high accuracy, so as to avoid so-called peak discharges. For this purpose the fixed non-conductor was sprayed with a metal coating, so as to ensure the constant spacing between the electrodes.

The object of the invention is to provide an apparatus of the aforementioned type for the generation of ozone, in which a turbulent flow is formed in simple manner in the flow channels, while simultaneously rendering uniform the surface distribution of the discharge channels for increasing effectiveness, According to the invention this object is solved in that at least one of the plate electrodes is oscillatable, the plate electrode comprises two layers of electrically conductive material, at least one layer being oscillatable, a material acting in resilient-attenuating manner is positioned between the two layers and the two layers are fixed to permit electrode oscillations.

It is possible with such an apparatus, through the application of a low frequency a.c. voltage and/or a suitable flow rate of the medium to be treated, to make the electrodes oscillate, so that a turbulent flow forms in the flow paths or channels between the electrodes and the dielectric. As a result of the oscillating electrodes there is in particular a separation of the interface in which otherwise normally a laminar flow prevails.

The width of the flow paths and the flow rate are such that the formation of a turbulent flow is guaranteed.

As is known, the nature of the flow (laminar or turbulent) results from the value of the Reynolds number:

$$Re = \frac{w * d * p}{\mu} = \frac{w * d}{v}$$

in which
 w = the average flow rate, m/s; d is the tube diameter, m;
 $\mu$ = the dynamic tenacity; kg/m s;
 p = the density of the liquid, kg/m;
 v = the kinematic tenacity; m/s.

If the flow cross-section is not circular, then the equivalent diameter corresponding to the multiple of the hydraulic radius is inserted in the expression for Re.

The hydraulic radius r represents the ratio of the area of the flow cross-section to the circumference U wetted by the flow:

$$r_h = \frac{f}{U}$$

For a tube having a circular cross-section, through which there is a full flow, we obtain:

$$r_h = \frac{d^2}{4d} = \frac{d}{4}$$

For a flow of non-circular cross-section one may thus, instead of the diameter, insert the equivalent diameter:

$$d_a = 4r_h = \frac{4f}{4}$$

Generally, in the case of a turbulent flow, the Reynolds number is above 2300 and there is an absolute turbulent flow at $Re > 10,000$.

SUMMARY OF THE INVENTION

As a result of the described design of the flow paths according to the invention and the thus resulting turbulent flow a uniformly distributed field of the spark discharges is obtained and per time unit far more gas particles are brought into the vicinity of the electrode surface. It is particularly advantageous that numerous small discharges occur, which lead to a much lower heat production, which is generally prejudicial to an effective ozone yield, so that ambient air is completely adequate as a cooling medium.

Thus, according to an advantageous embodiment of the invention, both layers are oscillatable. This improves the possibility of producing a turbulent flow.

According to a further advantageous embodiment of the invention, the two oscillatable layers are in each case brought together at the ends, which allows a simple mounting of the plate electrode.

According to another advantageous embodiment of the invention, there are several electrodes with the dielectrics each being positioned between two electrodes and combined as a subunit, the electrodes being connected in parallel in such a way that one electrode group is applied to ground potential and the other electrode group to high voltage. Several subunits can be combined to form a charging set.

According to a further advantageous embodiment of the invention, the charging set can be subject to action from a common gas distribution unit. The oscillatable layers can be made from electrically conductive and also treated films.

According to another possible embodiment of the invention, the oscillatable layers are made from electrically conductive metal sheets or plates.

Appropriately the oscillatable layers are made from platinum, titanium, galvanized iron or aluminium. These metals ensure a good electric field formation. The coatings can be of platinum, titanium, galvanized iron or aluminium in the form of films, sheets or wire netting.

According to another advantageous embodiment of the invention, the oscillatable layers have holes. This not only ensures the stripping off of the interface and therefore the generation of a completely turbulent flow, but said holes, when combining several units, also allow a gas exchange between the individual flow paths, which further increases flow turbulence.

In order to avoid an undesirably high oscillation amplitude of the electrodes, it is possible to provide guide grooves in the vicinity of the electrode ends. Contacting the coatings at the edges of the electrodes and a corresponding mounting of the edges in guide grooves ensures an unrestrained generation of the low frequency oscillation of the electrodes, a guidance of the flow and a self-contained resilient-attenuating mass system.

To further increase the effectiveness, it is also possible to provide the same with more than two oscillatable layers along and/or transversely to the flow direction which are made from electrically conductive material and which can perform controlled ratio movements e.g. due to a phase-displaced current direction.

It is also conceivable to connect in series electrodes with a specific length in the flow direction.

Appropriately, the resilient attenuation of the electrodes is regulated in order to ensure the gap widths necessary for the gas passage.

It is also possible by suitable regulating devices to control the gap width of the individual flow paths.

A further advantageous effect on the oscillations of the electrodes is achieved by the fact that the sink distribution of the flexible layers of the electrodes is regulatable.

Although it is possible to use any conductive or non-conductive resilient-attenuating material as the medium between the flexible layers, glass fibres have proved to be particularly advantageous.

For a better understanding of the present invention, reference is made to the following description and accompanying drawings while the scope of the invention will be pointed out in the appended claims.

DESCRIPTION OF THE PREFERRED EMBODIMENTS

Figure 1:
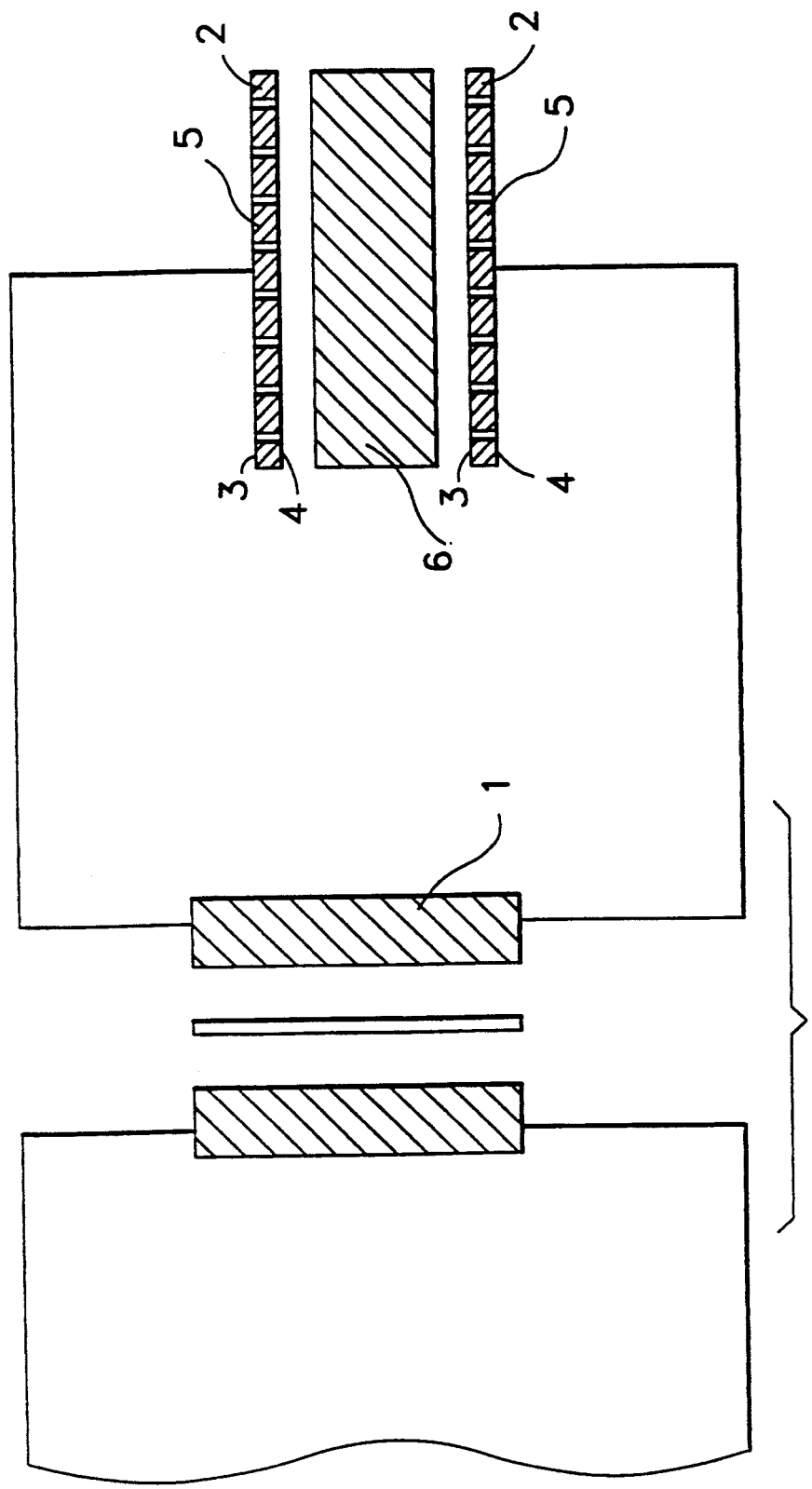
FIG. 1 illustrates a basic circuit diagram of the apparatus in a sectional view.

FIG. 1 diagrammatically shows a first embodiment of the ozone generating apparatus, the two electrodes 5 being connected to the secondary coil 1 of a high-voltage transformer. As a function of requirements, the high-voltage is between 5 and 30 kV. The high voltage transformer shown in FIG. 1 is designed for a frequency of 50 Hz. For the formation of e.g. two flow paths, a dielectric 6 is arranged between the two electrodes 5.

Each of the electrodes 5 comprises an elastic substrate 2 with a flexible coating 3,4 of an electrically conductive material placed on the substrate surface. The electrodes 5 have through holes perpendicular to the flow paths. The flexible coatings 3,4 are preferably made of platinum, titanium, galvanized iron or aluminium. They can be in the form of films, metal sheets or wire netting. It is also possible to vapor-coat the substrate 2 or the coating 3,4 with an electrically conductive material. The elastic substrate 2 is preferably of glass fibres.

When a high voltage is applied to the described apparatus for generating an electric field, the electrodes 5 are made to perform low frequency oscillations. Therefore the gas flowing in the gaps between the electrodes 5 and the dielectric 6 is also made to oscillate, which assists the formation of a turbulent flow.

Thus, per unit of time, far more gas particles can be brought into the vicinity of the electrode surface and a uniformly distributed field of the spark discharge is obtained.

With the primary mains voltage of 220 V, in the case of the embodiment shown in FIG. 1 approximately 10 kV are on the secondary side of the high voltage transformer. Compared with conventional ozonizers, the present apparatus provides an approximately 25% higher ozone yield from air.

Figure 2:
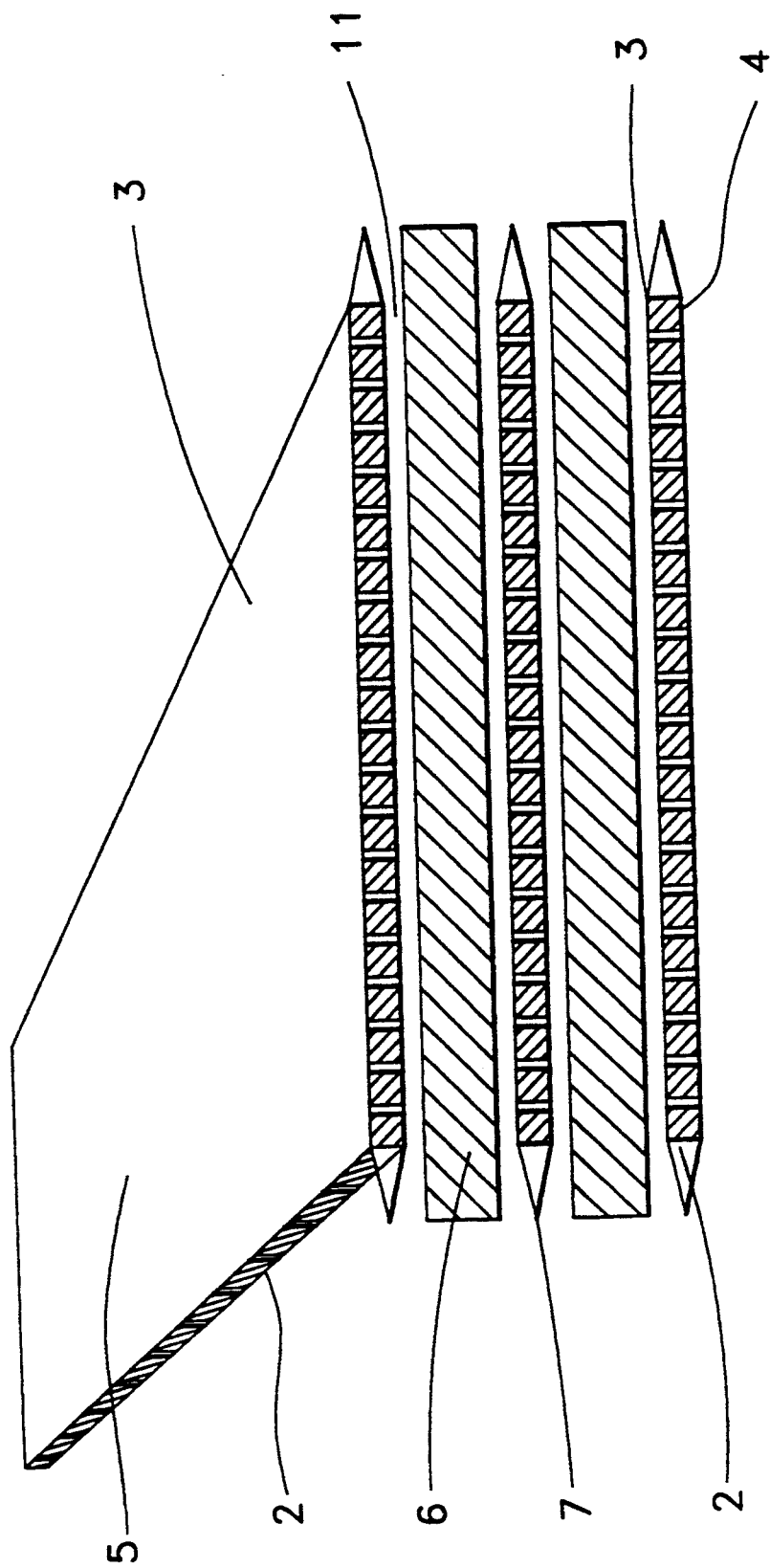
FIG. 2 illustrates a diagrammatic arrangement of several units according to FIG. 1 illustrates.

FIG. 2 shows a combination of several units according to FIG. 1, the edges 7 of the flexible coatings 3,4 being brought together and interconnected in order to form an edge. This edge is inserted in suitable guide grooves of a casing, so that the formation of oscillations of the individual electrodes 5 is limited but not impeded. In addition, through holes perpendicular to the flow paths 11 are formed in the electrodes 5. These holes permit a gas exchange between the individual flow paths, which further improves a uniform distribution, i.e. the formation of the turbulent flow.

Figure 3:
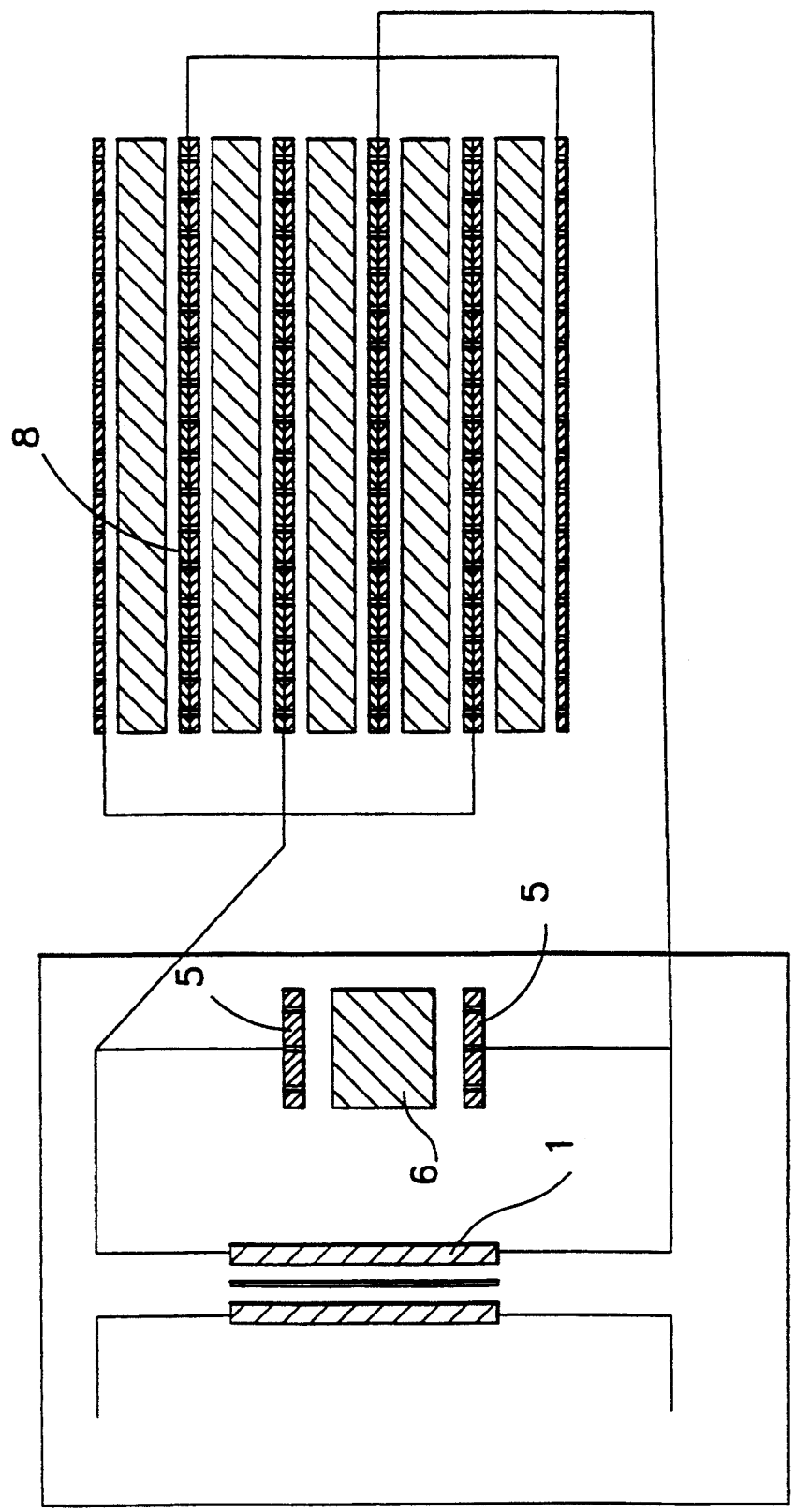
FIG. 3 shows a basic arrangement of oppositely poled electrodes forming a subunit.

FIG. 3 shows an embodiment comprising several electrodes 5 and interposed dielectrics 6. In the case of unit 8, two electrode groups are connected in parallel, one electrode group being ground and the other electrode group having a high voltage potential. The thus formed unit 8 is placed in a casing, which is sealed in gas-tight manner, so that the gas can flow through it.

Figure 4:
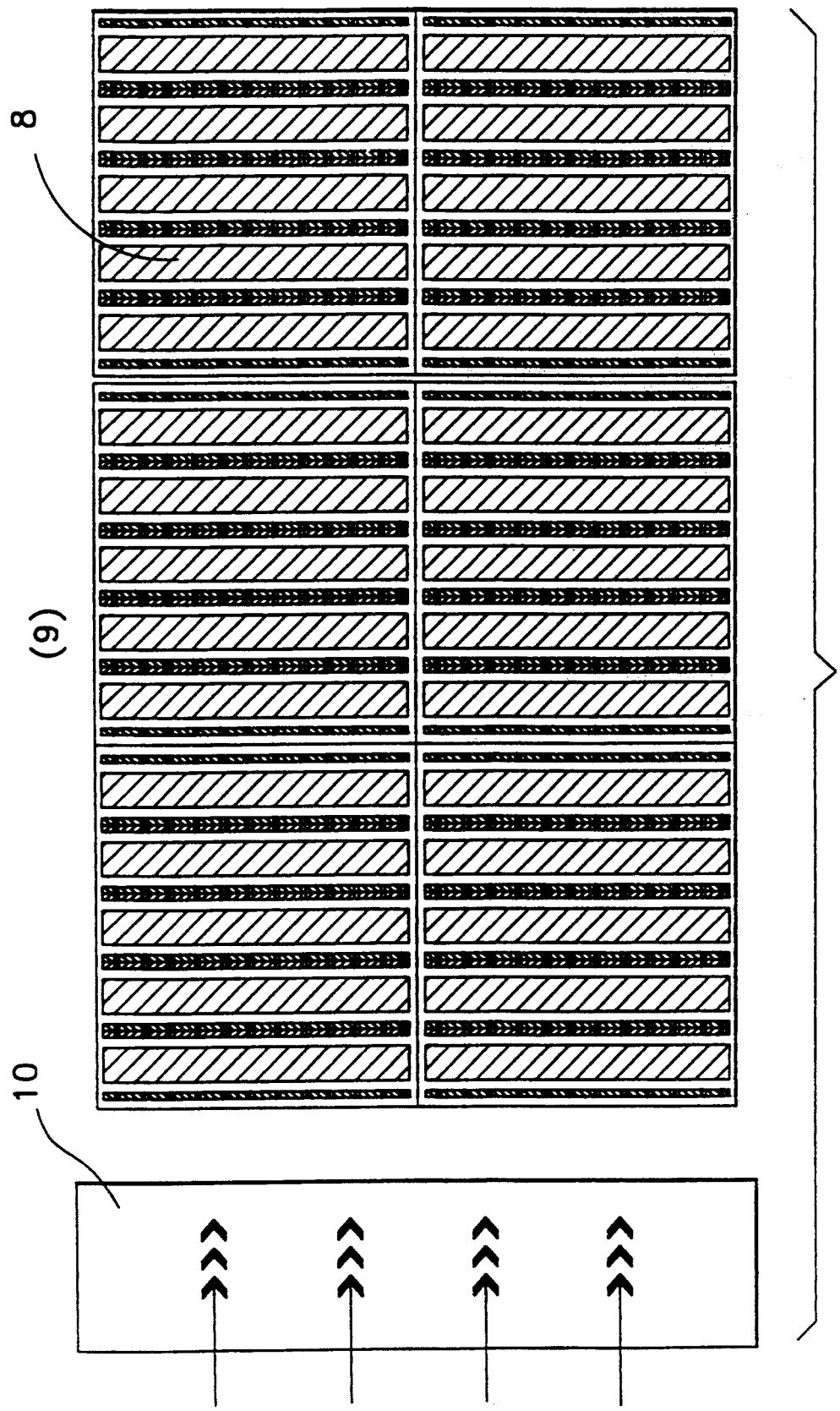
FIG. 4 shows a combination of several subunits to form a charging set.

FIG. 4 shows a further embodiment comprising several units according to FIG. 3. Thus, the invention makes it possible in simple manner to dimension the apparatus in accordance with requirements.

While the foregoing description and drawings represent the preferred embodiments of the present invention, it will be obvious to those skilled in the art that various changes and modifications may be made therein without departing from the true spirit and scope of the present invention.

What is claimed is:

1. Apparatus for the generation of ozone comprising
a high-voltage source;
at least two plate electrodes arranged at a distance to one another and with an interposed dielectric generating at least one flow path, at least one of the plate electrodes being oscillatable in part;
said oscillatable plate electrode having two layers of an electrically conductive material, at least one layer of which is oscillatable; and
a means effective to oscillate at least one layer of the electrically conductive material of said oscillatable plate;
a material which is resilient and has attenuating qualities being arranged between said two layers; and
wherein said two layers are fixed to enable oscillations of said oscillatable plate electrode.

2. Apparatus according to claim 1, wherein both layers are oscillatable.

3. Apparatus according to claim 2, wherein said the two oscillatable layers are each brought together at their ends.

4. Apparatus according to claim 1, including several plate electrodes each having dielectrics positioned between two of said plate electrodes and which are combined to form a subunit, said electrodes being connected in parallel in such a way that one electrode group is at ground potential and the other electrode group is high voltage.

5. Apparatus according to claim 4, wherein several subunits are combined to form a charging set.

6. Apparatus according to claim 5, wherein a common gas distribution unit acts on the charging set.

7. Apparatus according to claim 1, wherein the oscillatable layer is formed of electrically conductive, treated films.

8. Apparatus according to claim 1, wherein the oscillatable layer is formed of electrically conductive metal sheets.

9. Apparatus according to claim 7, wherein the oscillatable layer consists of platinum, titanium, galvanized iron or aluminium.

10. Apparatus according to claim 1, wherein the oscillatable layers has holes.

11. Apparatus according to claim 1, wherein the oscillatable layer is formed of wire netting.

12. Apparatus according to claim 1, including guide grooves for limiting the oscillation of the electrodes.

13. Apparatus according to claim 1, wherein resilient attenuation of the electrodes is regulatable to ensure the gap widths necessary for gas passage.

14. Apparatus according to claim 1, wherein the gap widths are subject to being controlled by regulating devices.

15. Apparatus according to claim 1, wherein the sink distribution of the flexible layers of the electrodes is subject to being controlled by regulating devices.

16. Apparatus according to claim 1, wherein the material which is resilient and has attenuating qualities consists of glass fibres.

* * * * *